US011529272B2

(12) United States Patent
Akers, Jr.

(10) Patent No.: US 11,529,272 B2
(45) Date of Patent: Dec. 20, 2022

(54) POWER LIFT

(71) Applicant: Uriah S. Akers, Jr., Ture, WV (US)

(72) Inventor: Uriah S. Akers, Jr., Ture, WV (US)

( * ) Notice: Subject to any disclaimer, the term of this patent is extended or adjusted under 35 U.S.C. 154(b) by 239 days.

(21) Appl. No.: 16/636,322

(22) PCT Filed: Aug. 1, 2018

(86) PCT No.: PCT/US2018/044894
§ 371 (c)(1),
(2) Date: Feb. 3, 2020

(87) PCT Pub. No.: WO2019/028194
PCT Pub. Date: Feb. 7, 2019

(65) Prior Publication Data
US 2021/0161738 A1    Jun. 3, 2021

Related U.S. Application Data

(60) Provisional application No. 62/539,545, filed on Aug. 1, 2017.

(51) Int. Cl.
*A61G 3/06*    (2006.01)
*A61G 1/02*    (2006.01)
(Continued)

(52) U.S. Cl.
CPC ........... *A61G 3/062* (2013.01); *A61G 1/0212* (2013.01); *A61G 1/0567* (2013.01); *A61G 3/029* (2013.01); *A61G 3/0236* (2013.01); *A61G 3/0245* (2013.01); *A61G 3/0254* (2013.01); *A61G 3/0272* (2013.01); *A61G 3/0825* (2013.01); *A61G 3/0883* (2013.01); *A61G 3/0891* (2013.01)

(58) Field of Classification Search
CPC .. A61G 3/0218; A61G 3/0236; A61G 3/0245; A61G 3/0254; A61G 3/029; A61G 3/0272; A61G 3/062; A61G 3/0825
See application file for complete search history.

(56) References Cited

U.S. PATENT DOCUMENTS

| 7,637,550 B2 * | 12/2009 | Menna | A61G 7/012 296/20 |
| 9,289,336 B2 * | 3/2016 | Lambarth | A61G 3/029 |
(Continued)

FOREIGN PATENT DOCUMENTS

| EP | 2366369 A2 * | 9/2011 | A61G 3/0263 |
| EP | 3064186 A1 * | 9/2016 | A61G 3/065 |
(Continued)

*Primary Examiner* — Kaitlin S Joerger
(74) *Attorney, Agent, or Firm* — Mary-Jacq Holroyd; Johnston Holroyd

(57) ABSTRACT

A deployable gurney lift assembly (12), which has a carriage assembly (14) plate (20) with two pivot arms (38) disposed opposite one another on each side of the carriage assembly (14), an antler holder (16) to accommodate a bar of the gurney, and at least one hydraulic, pneumatic, or electric jack (22) lift actuator for lifting and lowering the arms (38). Retractable deployment apparatus for slidably moving the retractable deployment apparatus along a length of base tracks (28). Base tracks (28) having rear ends terminating in stops (42), and carriage assembly (14) guides slidably engaged along deployment tracks (28).

27 Claims, 15 Drawing Sheets

(51) Int. Cl.
*A61G 1/056* (2006.01)
*A61G 3/02* (2006.01)
*A61G 3/08* (2006.01)

(56) References Cited

U.S. PATENT DOCUMENTS

| | | | |
|---|---|---|---|
| 9,456,939 B2 * | 10/2016 | Lambarth | ............ A61G 3/0883 |
| 9,545,345 B1 * | 1/2017 | Akers, Jr. | ............ A61G 3/0272 |
| 11,077,000 B2 * | 8/2021 | Braun | .................... A61G 3/029 |
| 2008/0240901 A1 * | 10/2008 | Lambarth | ............ A61G 1/0567 |
| | | | 414/809 |
| 2009/0015027 A1 * | 1/2009 | Lambarth | ............ A61G 3/0272 |
| | | | 296/20 |
| 2012/0237326 A1 * | 9/2012 | Van Ness | ............ A61G 3/0272 |
| | | | 414/507 |

FOREIGN PATENT DOCUMENTS

| | | | | |
|---|---|---|---|---|
| EP | 3020381 B1 * | 5/2018 | ............ | A61G 3/0254 |
| FR | 3100712 A1 * | 3/2021 | ............ | A61G 3/0245 |
| WO | WO-9004377 A1 * | 5/1990 | ............ | A61G 3/0254 |
| WO | WO-2016007290 A1 * | 1/2016 | ................ | A61G 1/02 |

* cited by examiner

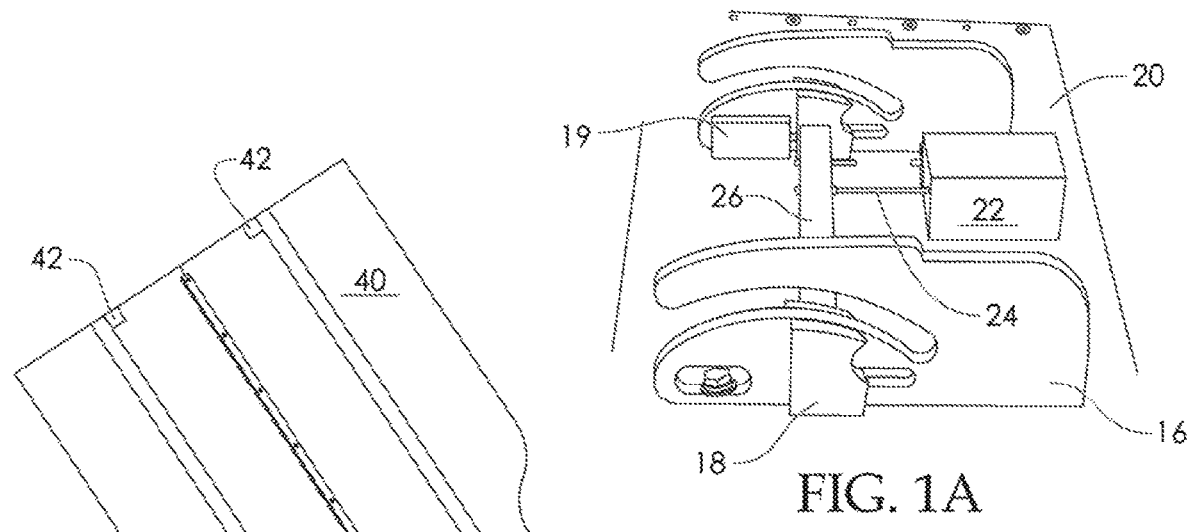
FIG. 1A
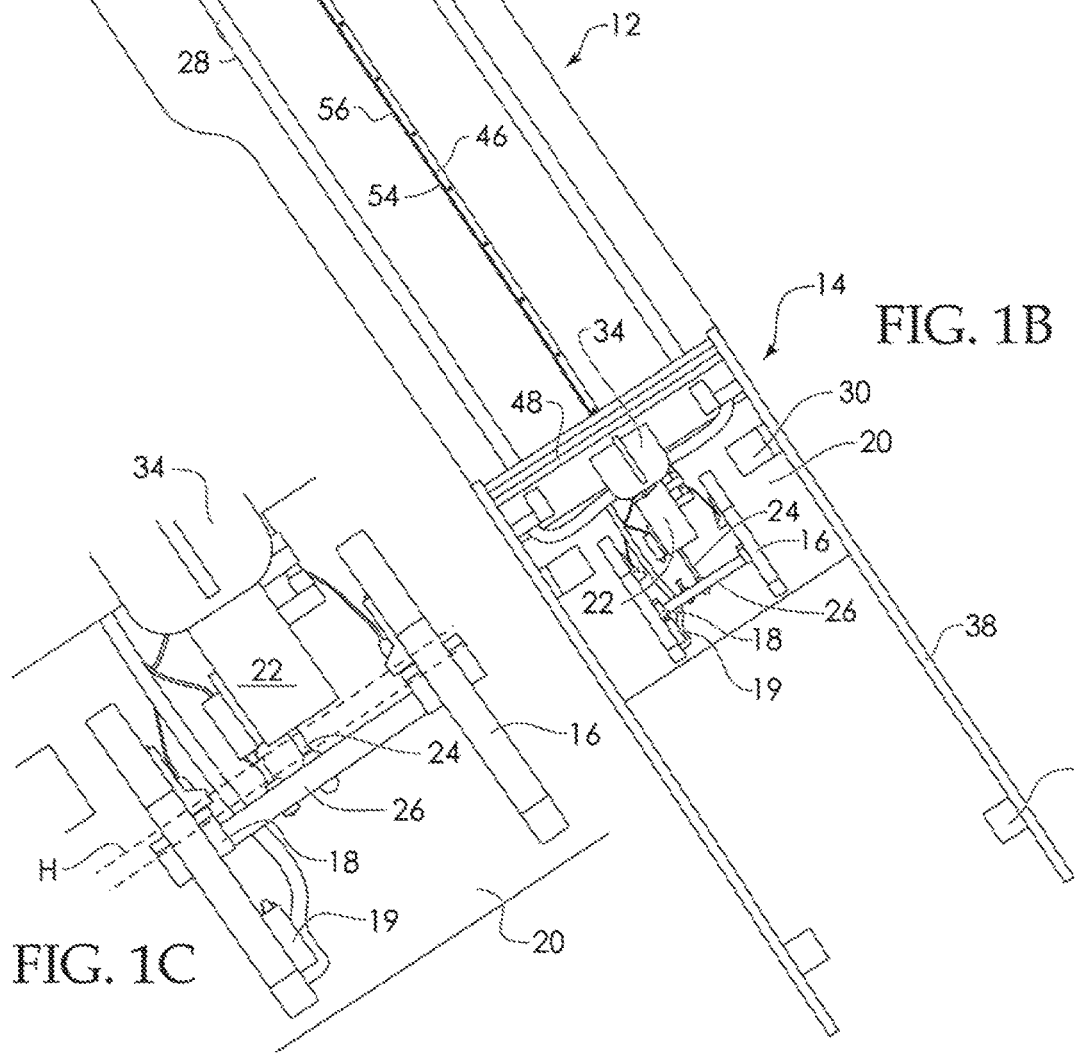
FIG. 1B
FIG. 1C

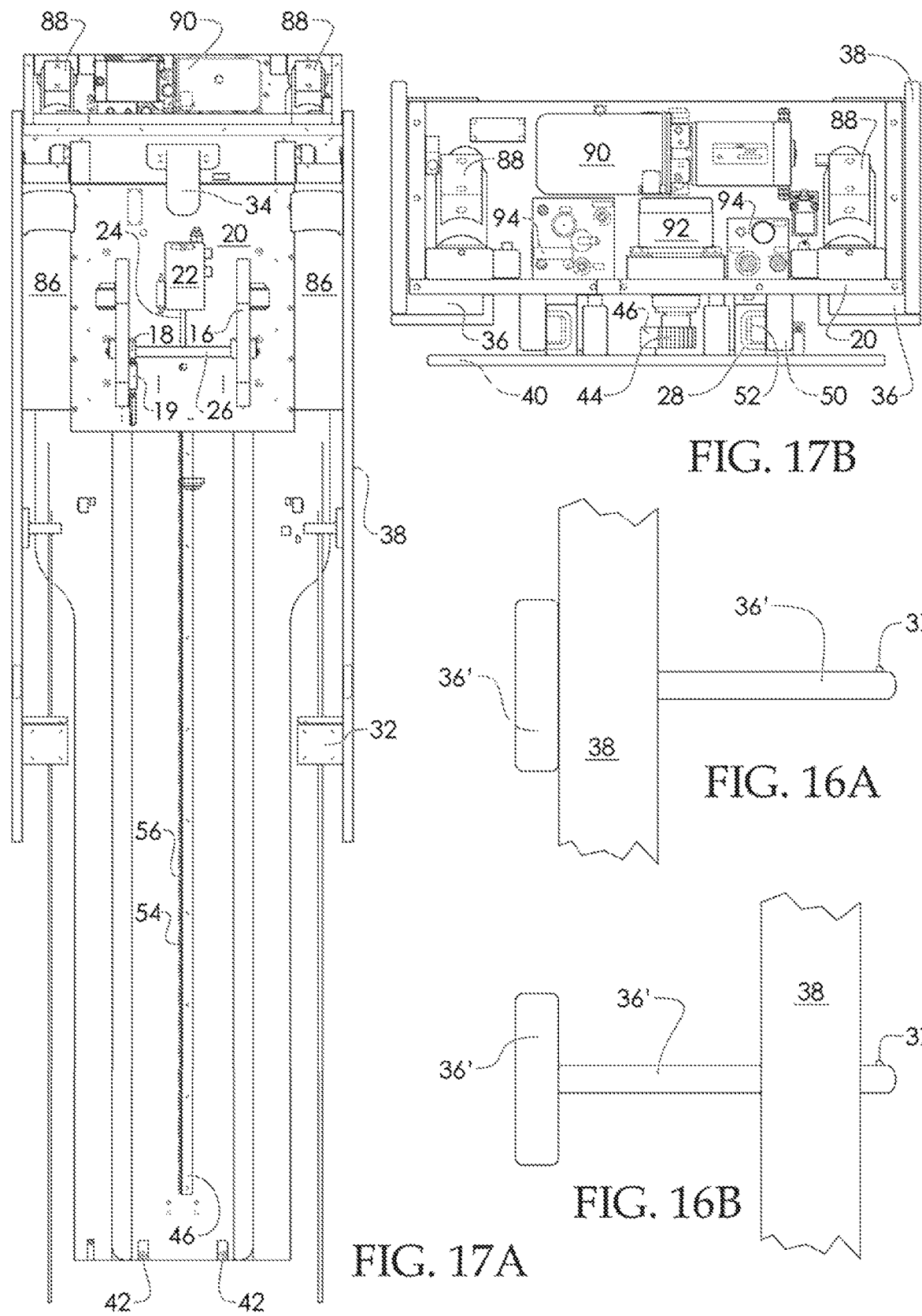

POWER LIFT

RELATED APPLICATIONS

This application claims the benefit of U.S. Provisional Application Ser. No. 62/539,545 entitled "Power Lift" filed on 1 Aug. 2017, the contents of which are incorporated herein by reference in its entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The transportation of patients to and from ambulances is known. Frequently, the transportation of patients from a level curbside or flat ground into, and out of, an emergency vehicle is not possible. Patients are often transported from an emergency or rural location where there are no curbs or even road access. Under both circumstances, patients must be lifted into a transport vehicle typically using a gurney and then loaded into the transport vehicle.

Injuries for emergency personnel transporting patients are common. Back injuries and muscle strains resulting from lifting patients and gurneys are common ailments. Uneven or rough terrains make injuries even more likely. The same is true for helicopter transportation, as well.

There exists a need for patient vehicle loading and unloading in which emergency personnel have a minimum need to physically lift or move the patient into or out of the emergency transport vehicle, such as an ambulance or helicopter.

A parallel arm carriage running on tracks is shown in U.S. Pat. No. 8,439,416 issued on 14 May 2013 and assigned to Stryker Corporation shows an ambulance cot and loading and unloading system has parallel arms extending from a carriage that engages the bottom of a stretcher and has a mechanism for raising the arms. A clamp holds the stretcher into place. The carriage assembly is found in U.S. Pat. No. 7,540,547 B2, issued 2 Jun. 2009 and assigned to Stryker Corporation, has a movable carriage with a two-point track holder on the carriage that affixed the undercarriage of a cot thereto. Similarly, U.S. Pat. No. 7,520,551 B2, issued 21 Apr. 2009 and assigned to Stryker Corporation, has the same disclosure showing a retractable carriage with a two-point part to affix a cot securely in place along the railings. U.S. Pat. No. 7,478,855, issued 20 Jan. 2009 and assigned to Stryker Corporation, also has the movable carriage, which also tilts forward at the end of the rails to engage the cot. Furthermore, Track with cot fasteners with a two-point fastener or restrain systems may be required for new ambulances, is shown in U.S. Pat. Nos. 7,887,113 B2 and 8,439,416 B2 issued on 15 Feb. 2011 and on 14 May 2013 respectively and assigned to Stryker Corporation, both show an ambulance cot and loading and unloading system that utilizes a railing with a two-point cot retention section and a carriage with two arms extending therefrom to engage a cot. The base or track has two points to secure the cot along the length thereof. Stryker has several cot fasteners, that have a two-point restraint, including both manual in which the cot is manually pushed into and pulled out of the ambulance and an automated version which has two arms that are lowered to engage the undercarriage of a cot. Track with cot fasteners with a two-point fastener or restrain systems may be required for new ambulances.

Shuttle assemblies that pull cots along a pair of tracks are well known. U.S. Pat. No. 8,534,732 B2 issued 17 Sep. 2013 to Bourgraf et al. and assigned to Ferno-Washington, Inc. teaches a combination cot loading and fastening system for loading and unloading a cot that utilizes a shuttle assembly to securely pull the ambulance cot along the pair of tracks and a locking mechanism mounted on the shuttle assembly. The track extends to the rear of an ambulance and curves downward to deliver the cot to a proper height for the wheel carriage to reach the ground. The assembly therein does not utilize parallel arms to hold the cot in place. See abstract and figures. U.S. Pat. No. 8,444,195, issued on 21 May 2013 and assigned to Ferno-Washington, Inc., teaches a combination cot loading and fastening system that shows a single bell bar clamp which is manually engaged/disengaged. These features are used by both Stryker and Ferno-Washington, Inc. U.S. Patent App. Pub. No. US 2017/0252235 A1 Issued on 7 Sep. 2017 to Valentino et al. and assigned to Ferno-Washington, Inc. for a cot fastening system having a crash stable cot fastener track and method of affixing an emergency cot thereto, which shows a cot and a modifiable fastener track, which may be suitable for use with the present design.

Parallel arm carriages running on tracks are well known. Australian Patent No. AU2008216990A1, applied for by DHS Pty Ltd and published (30) April 2009, for a cot loading assembly shows a track that has a frame with arms extending outward therefrom and rides upon the track, and has a retention mechanism to hold the cot in place from beneath. European Patent Application No. EP2412356A1, published on 1 Feb. 2012 and applied for by Kartsana S. L., shows a device for the introduction of stretcher into an ambulance, which used arms extending from a framework that slidably engaged parallel tracks and lift a stretcher thereon from beneath. U.S. Pat. No. 6,332,638, issued on 25 Dec. 2001 and Ezio Menna and assigned to Stem S. R. L., and teaches an apparatus for loading stretchers onto ambulances, and includes parallel arms on a carriage that extends from the rear of the ambulance to engage a bar on a stretcher and to retract it into the ambulance.

Lowering track/frame to engage external cot are used elsewhere, as well. PCT Patent Application published as International Publication No. WO2011/054581A1 published on 12 May 2011 shows a device for receiving a stretcher into a motor vehicle with a patient on the stretcher that has a pair of telescoping racks in its deployment system using three telescoping rails within each rack, and a device for lifting the front ends of the linear guides in order to lower the rear ends thereof. US Patent Application No. 2012/0237326A1 published 20 Sep. 2012 and assigned to Montrose Innovations, LLC for a system and method for transferring a wheeled load into a transport vehicle that also demonstrates a mechanism to tilt a tack upwards at the rear such that the front part which engages with the stretcher is pitched downward at the rear to engage and lift a stretched. Another clamping holder (16) is found in PCT Patent Application published as International Publication No. WO 2010/145,691 A1 published on 23 Dec. 2010, which teaches a stretcher receiving device which shows two clamping holders (16) for receiving a bar of the stretcher to hold the stretcher securely in place.

An actuator accessible from the rear of the ambulance is known. PCT Patent Application published as International Publication No. WO2012/006719A1 published on 19 Jan. 2012 shows a stretcher lift for an ambulance which helps loading a wheeled stretcher. The stretcher lift has an actuator on the outside and a drive means to lift and lower the stretcher lift, but otherwise does not pull the stretcher into the ambulance.

SUMMARY OF THE INVENTION

The present invention relates to a transport vehicle supported power lift for lifting patient laden gurney into a transport vehicle. The present design is especially adapted to lifting a patient on a gurney into a transport vehicle whether ambulance, helicopter, or the like, and from uneven ground.

The invention may utilize a push button actuation, or a single actuator per stage, and is fully automated so that no other lifting force is required. The actuator or button actuation may be carried out using wireless technology including actuation by handheld devices. Alternatively, permanently mounted devices or the like may be used, which may be hardwired, or wirelessly actuated.

An aspect of the present design is that it protects the operator by not requiring the lifting and lowering, or optionally pulling and pushing, required in stowing or unloading most gurneys. The gurney becomes locked into place by a mechanical lock.

Another aspect of the present design is that it operates with the use of a series of actuators operated by the touch of a button, or equivalent input device, instead of relying on manual lifting. The actuators deploy to bring a ramp-less carriage assembly out of truck, raise and lower carriage assembly (14) to raise and lower a gurney.

Yet another aspect of the present design is that it retracts and stows out of the way while maintaining a secure attachment to the gurney preventing it from becoming dislodged or tipping even under roller over conditions.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIGS. 1A-1C show the actuation mechanism of a deployable gurney ramp-less assembly (12) according to alternative embodiments of the present design.

FIGS. 16A and 16B show the position of an alternative locking bracket (36').

17A and 17B show the position of the hydraulics.

FIGS. 18A-18C show an alternative deployable gurney ramp and ramp assembly which is deployed by manually pulling the gurney out and pushing the gurney in.

Similar reference characters denote corresponding features consistently throughout the attached drawings.

DETAILED DESCRIPTION OF PREFERRED EMBODIMENTS

Figure 2A:
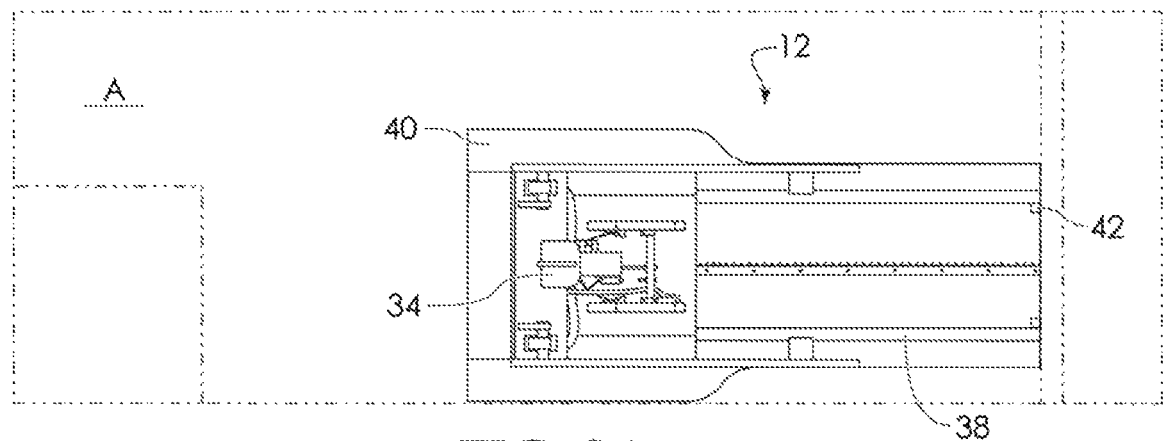
FIGS. 2A-2C show a deployable gurney ramp-less assembly (12) according to the embodiment of FIG. 1A with the assembly fully withdrawn into an ambulance depicted in dashed lines.

FIGS. 1A-1C show a deployable ramp-less gurney lift assembly (12) which has a gurney antler handlebar retention mechanism to securely hold, lift, and stow a gurney G. FIG. 1A shows parts of a carriage assembly (14) that includes antler locks (16) and antler latches (18) in the open position without a gurney antler handlebar. A cot release mechanical limit switch 19 may be provided to check the advance of one of the antler latches (18), as shown. Optionally, only one antler latch (18) may be used with two or one antler locks (16). Although not preferred, several antler locks (16) may be used with or without individual antler latches (18). The antler lock(s) (16) configurations described herein include a single antler lock (16) with a single antler latch (18), two antler locks (16) with either a single antler latch (18) or two antler latches (18). Additional antler locks (16) and antler latches (18) may be used.

The carriage assembly (14), which has the antler locks (16) and latches (18), is shown in FIG. 1B in position on the lift assembly (12) in the fully deployed position. The antler locks (16) and antler latches (18) are shown affixed to a carriage assembly (14) plate (20). A hydraulic jack (22) is also affixed to the carriage assembly (14) plate (20) and has an actuation arm (24) affixed to a bar (26) that moves the latches (18) from an open position to a closed position. The open position is shown in FIGS. 1A and 1B, while the closed position is shown in FIG. 1C. The carriage assembly (14) is affixed to a carriage assembly (14) plate (20) which slides along the rails (28) to deploy and to retract the carriage assembly (14) along the rails (28).

In operation, the vehicle battery supply may be used, or a battery power supply may be used which recharges when docked, that is when the carriage assembly (14) is fully stowed. Wireless controllers may also be provided which may optionally be recharged upon docking. Mechanism functions include hydraulic, pneumatic, electric, or any like means. The unit may be installed without a powered deployed stow function for manual stow and deploy functions. The motor box may consist of different shapes, sizes, and configurations with or without drive components. The locking mechanism may be adapted for use with commonly used pin locking rods used on newer model commonly used cots or gurneys. Depending on the type of gurney being used, wheel frame handles may or may not be present.

FIG. 1C is an end view of the carriage assembly (14) with the antler latch (18) in the closed position relative to a gurney antler handle H inserted into the antler lock (16). In alternative embodiments, the antler lock (16) and latch (18) combination may consist of only one antler lock (16) with only one antler latch (18), more than two antler locks (16) and a corresponding number of antler latches (18), or variations thereof. Two antler locks (16) with two to four latches (18) provide sufficient stability to retain a gurney G securely on the carriage assembly (14). The wheel lock (30), rotating pickups (32), wheel frame lock (34), and wheel locking brackets (36) which are under the rotating pickups (32), and all of which are disposed on the arms (38) of the carriage assembly (14) as shown, provide support and stability of the gurney G when the antler handlebar H or cot safety bell is locked into place on the antler locks (16). In operation, the secured gurney G is lifted into place by a lift actuator with a patient on the gurney G and retracted therewith into the ambulance A as shown in the FIGS. 2A-7E. The carriage assembly (14) has a first retraction guide (50) extending from the sides of the carriage assembly (14) plate (20) for sliding the carriage assembly (14) in and out of the ambulance A along the rails (28). A wheel bearing (52), such as a cam follower, may extend from the retraction guide (50) to more firmly engage the rails (28).

Figure 2B:
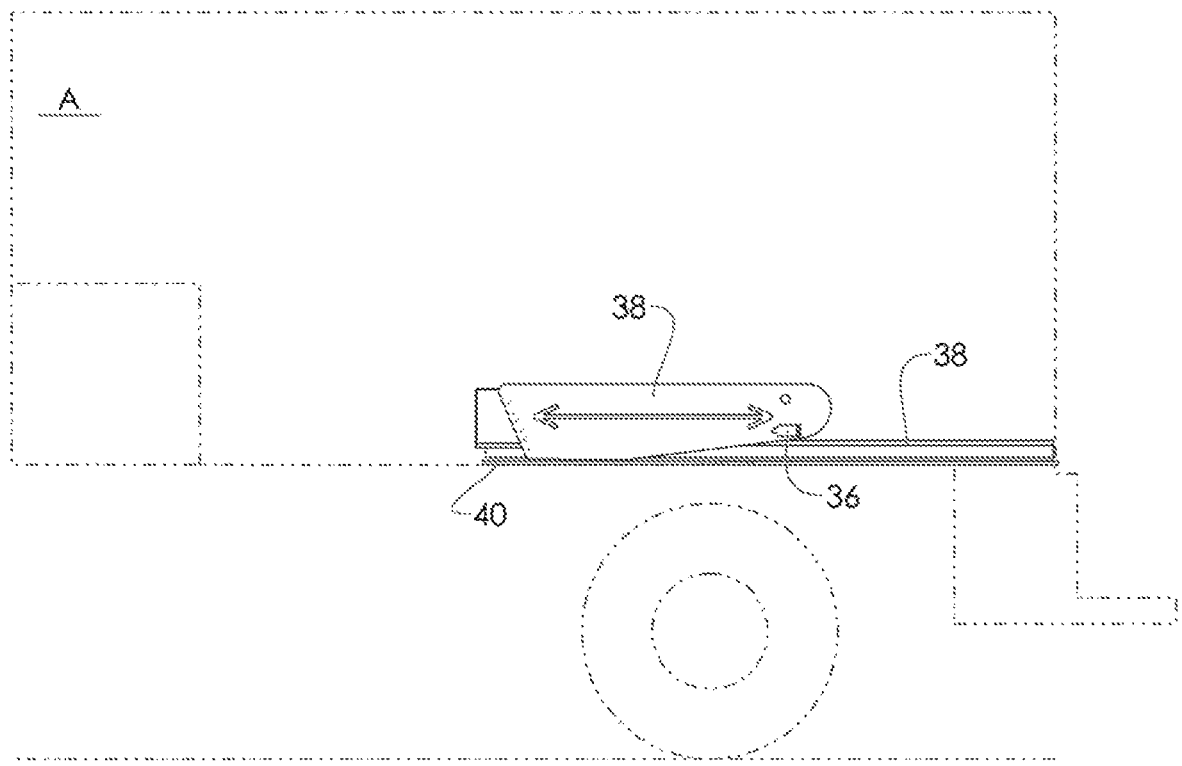
Figure 2C:
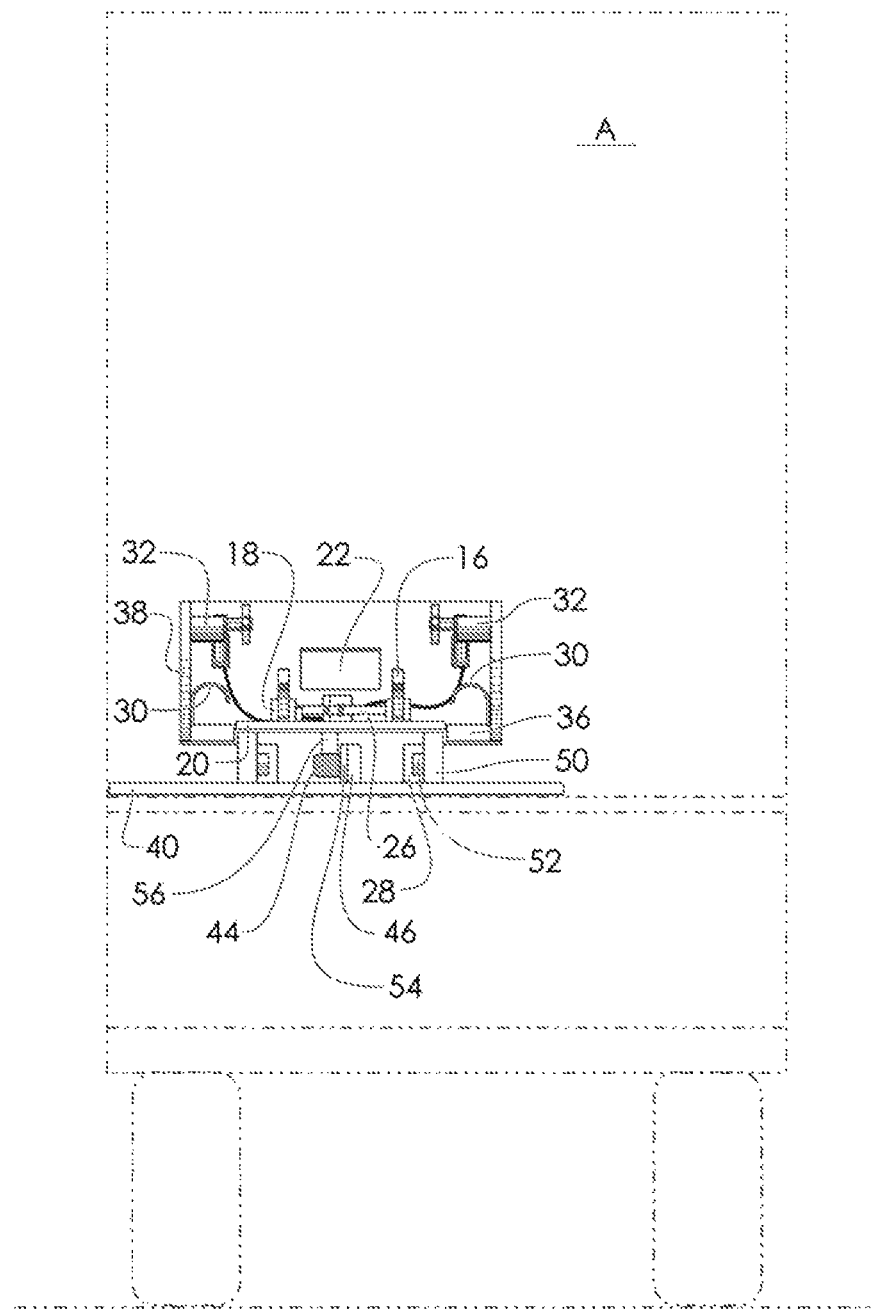

FIGS. 2A-2C show a deployable gurney ramp-less gurney lift assembly (12) according to the embodiment of FIG. 1A with the carriage assembly (14) fully withdrawn, or stowed, in an ambulance A. The ambulance is depicted in dashed lines. FIG. 2A is a plan view of the carriage assembly (14) stowed in the ambulance A without a gurney G. The end of the floor plate (40) is flush with the rear door leaving enough room for the door to close. The rail stops (42) are provided to prevent the carriage assembly (14) from being advanced off of the rails (28) when fully retracted. Rail wedge stops (42) may optionally be provided at the other ends of the rails (28) to prevent the carriage assembly (14) from being advanced off of the rails (28) when fully deployed. FIG. 2B is a side view of the carriage assembly (14) fully stowed. FIG. 2C is an end view the carriage assembly (14) from the rear of the ambulance. Rail stops (42) are not shown if FIG. 2C so that the relationship of the optional gear (44) and gear rack (46), which may also have a gear rack plate (54), may be seen more clearly. In operation, the gear (44) is rotated on a shaft (55), and advances the carriage assembly (14) along teeth (56), which may be on the gear rack (46) or on a gear rack plate (54) affixed along the length of the gear rack (46). In FIG. 2C, the position of the wheel locking brackets (36) can be seen under the rotating pickups (32).

Figure 3A:
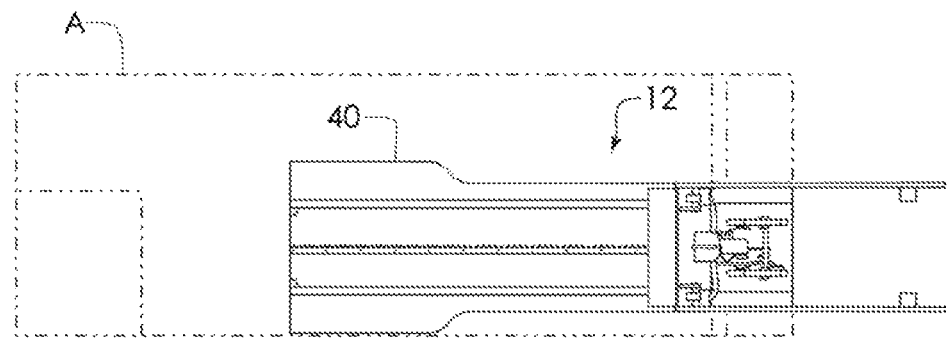
FIGS. 3A-3C show a deployable gurney ramp-less assembly (12) according to the embodiment of FIG. 1A with the assembly fully deployed from the ambulance with the carriage assembly (14) in the up position.
Figure 3B:
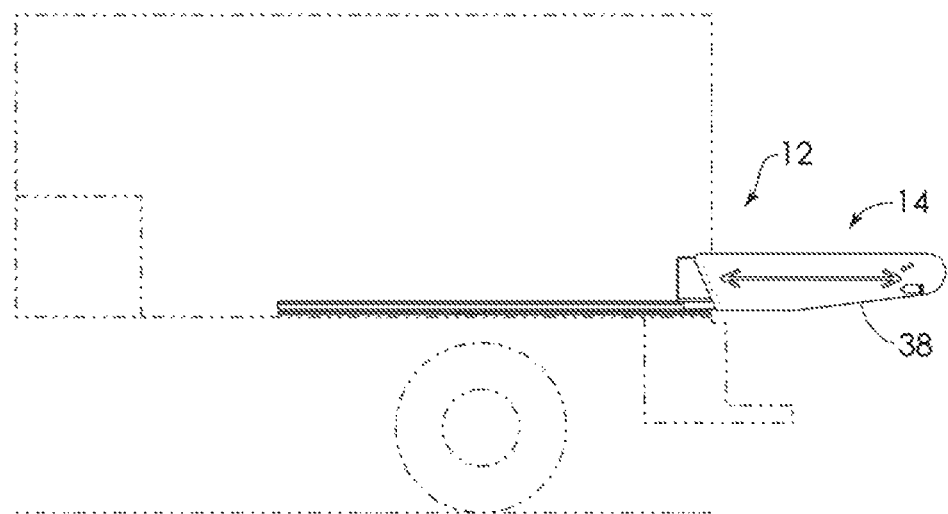
Figure 3C:
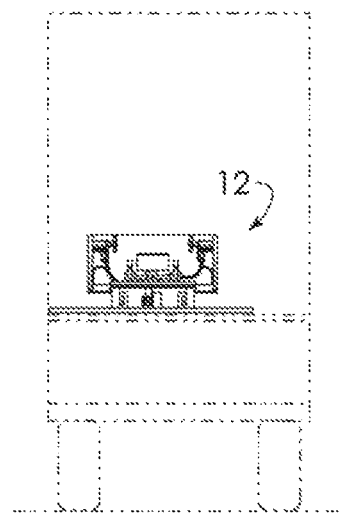

FIGS. 3A-3C show a deployable gurney ramp-less assembly (12) according to the embodiment of FIG. 1A with the carriage assembly (14) fully deployed from the ambulance A with the carriage assembly (14) in an up position. FIG. 3A is a plan view in which the position of the carriage assembly (14) is fully deployed but still in the up position. An accordion-style hand guard (48), which is disposed at the back of the carriage assembly (12), is fully compressed in the up position. The hand guard (48) and covered area may be shaped differently than shown. FIG. 3B shows a side view of the deployable gurney ramp-less assembly (12) in which the carriage assembly (14) is in the up position. FIG. 3C is an end view from the rear with the fully deployed carriage assembly (14) in the up position.

Figure 4A:
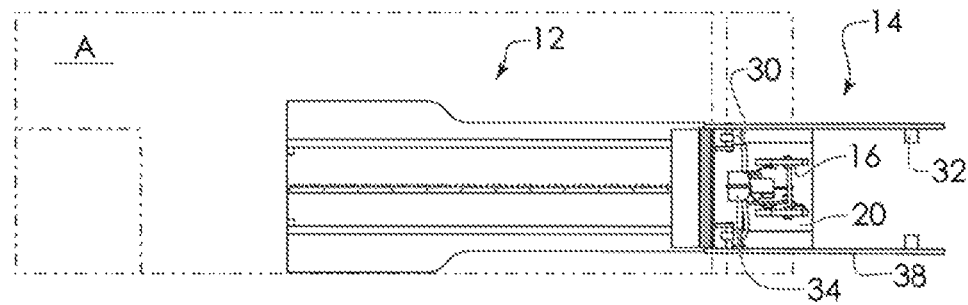
FIGS. 4A-4C show a deployable gurney ramp-less assembly (12) according to the embodiment of FIG. 1A with the assembly fully deployed from the ambulance with the retractable ramp-less assembly in the maximum extension from the tracks and tilted down ready to accept a gurney.
Figure 4B:
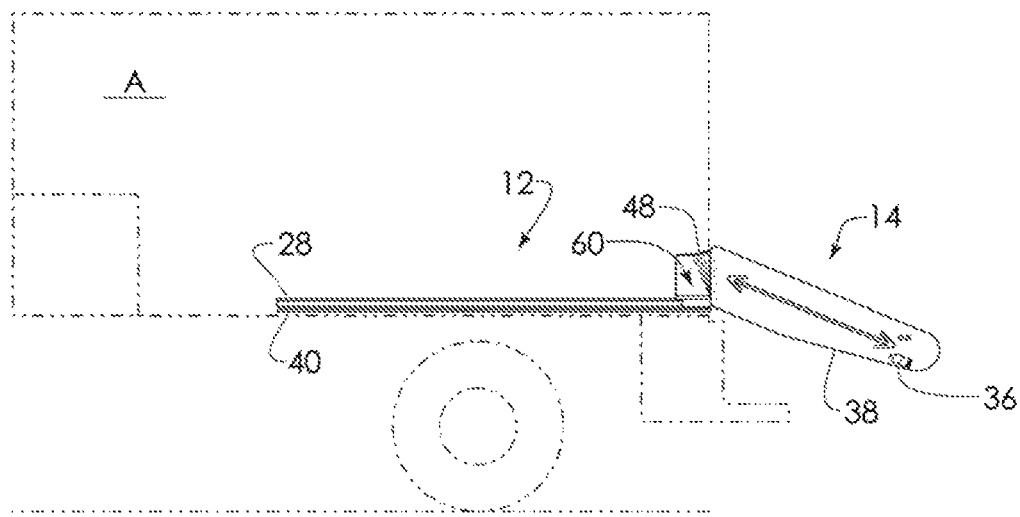
Figure 4C:
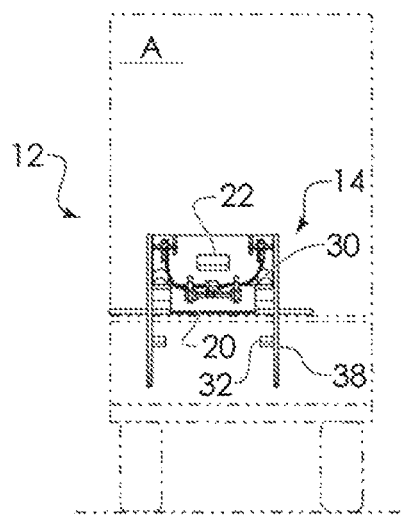

FIGS. 4A-4C show a deployable gurney ramp-less assembly (12) according to the embodiment of FIG. 1A with the carriage assembly (14) fully deployed from the ambulance A with the retractable ramp-less assembly (14) in the maximum extension from the tracks (28) and tilted down ready to accept a gurney G. FIG. 4A is a plan view of the deployed carriage assembly (14) in the down position showing a folding accordion-style hand pinch guard (48) stretched out. The hand pinch guard (48) covers the space between the motor case (60) and the front (62) of the carriage arms (38) when in the down position, as shown more clearly in side view depicted in FIG. 4B. Without this feature, a gap is disposed between the motor case (60) and carriage arms (38) that may cause injury or damage when something falls therein. FIG. 4B demonstrates where the gap between the motor housing (60) and the carriage aims (38) is covered by the pinch guard (48). FIG. 4C is an end view of the rear of the carriage assembly (38) in fully deployed and down positions.

Figure 5A:
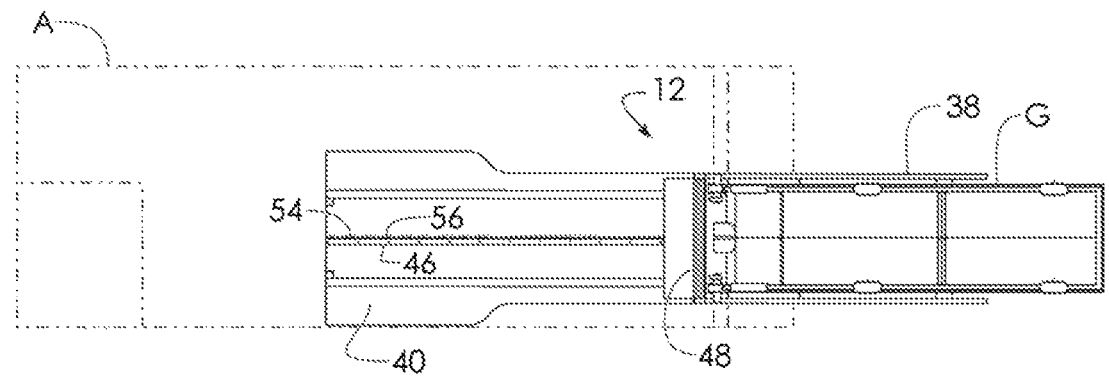
FIGS. 5A-5C show the deployed gurney ramp-less assembly (12) of FIGS. 4A-4C fully deployed state in tilted down position with an upright gurney locked into position on the lowered retractable ramp-less assembly with the gurney wheel assembly still down.
Figure 5B:
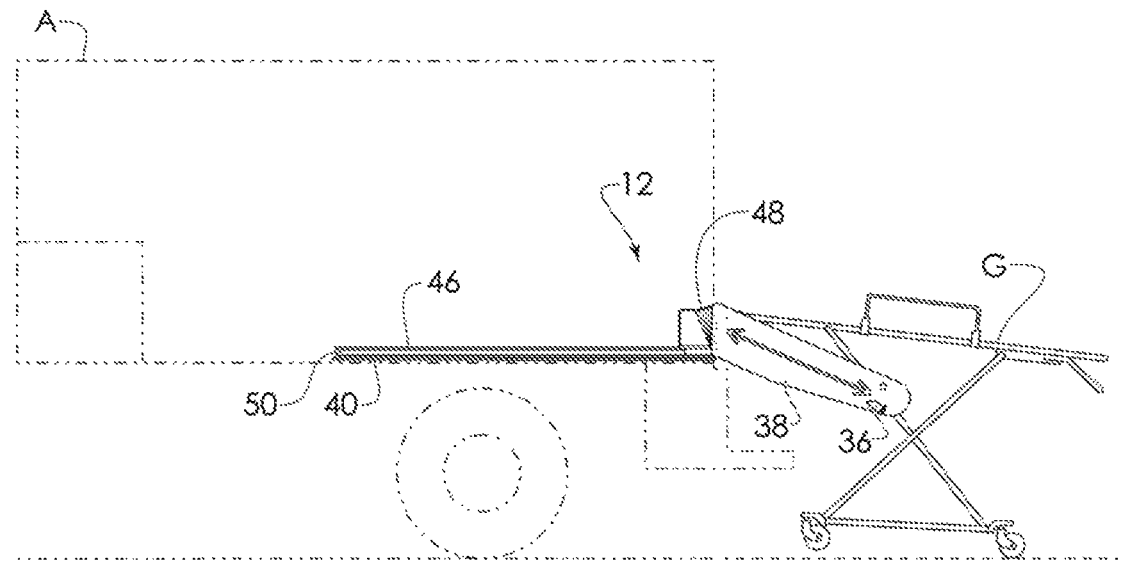
Figure 5C:
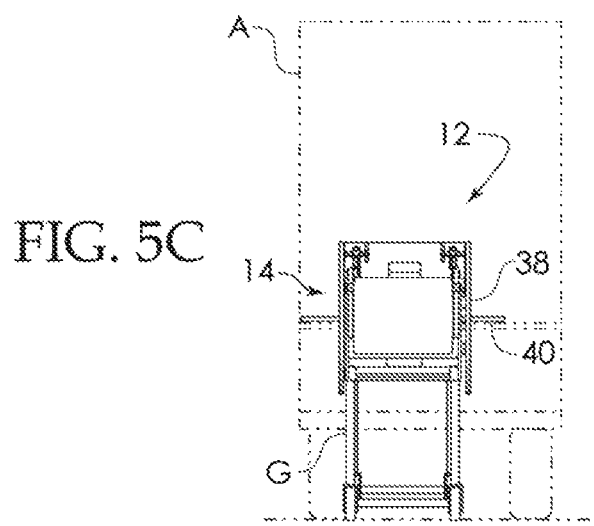

FIGS. 5A-5C show the deployed gurney ramp-less assembly (12) of FIGS. 4A-4C fully deployed state in tilted down position with an upright gurney G locked into position on the lowered carriage arms (38) with the gurney G wheel assembly still down, as shown. FIG. 5A shows a top view of the deployed gurney ram-less assembly (12) with the carriage arms (38) in position having the gurney G positioned properly for lift. FIG. 5B is a side view of the ramp-less assembly (12) with the carriage arms (38) down and in position to hold the gurney G for lift. FIG. 5C is a rear view of the gurney ramp-less assembly (12) showing the gurney G in proper position to be lifted.

Figure 6A:
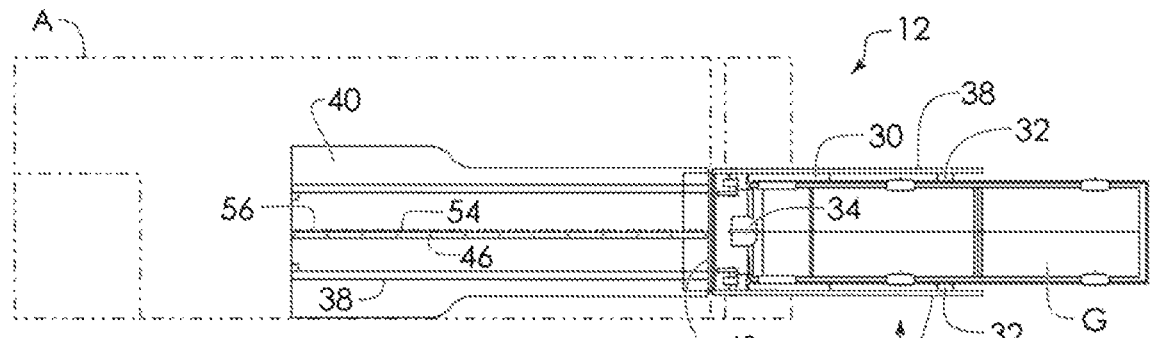
FIG. 6A-6C show a deployed ramp-less assembly (12) with gurney locked in and tilted up to horizontal position with gurney wheels still extended to down position.
Figure 6B:
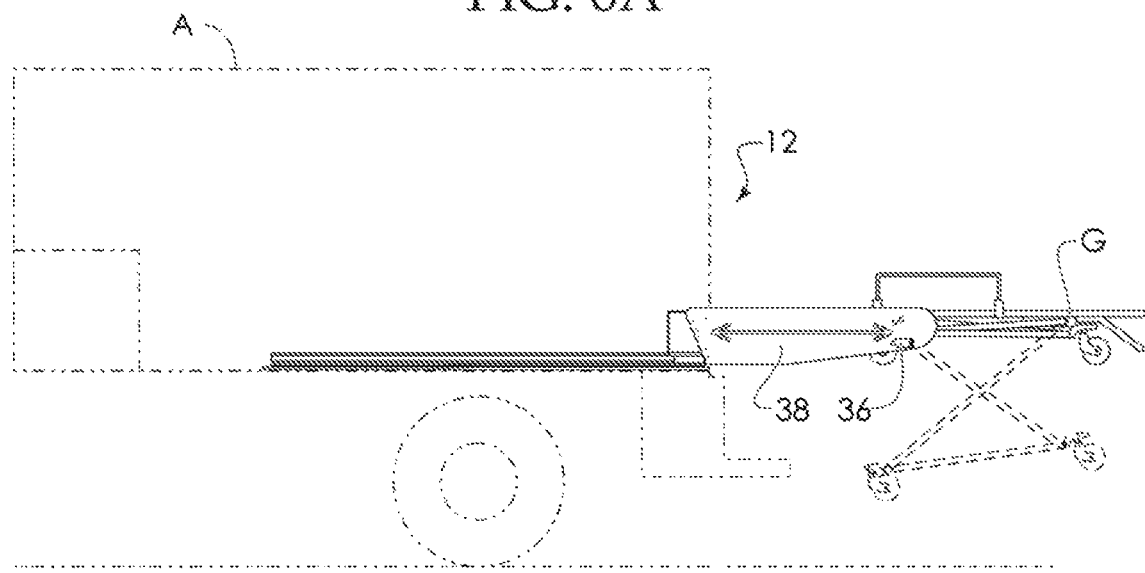
Figure 6C:
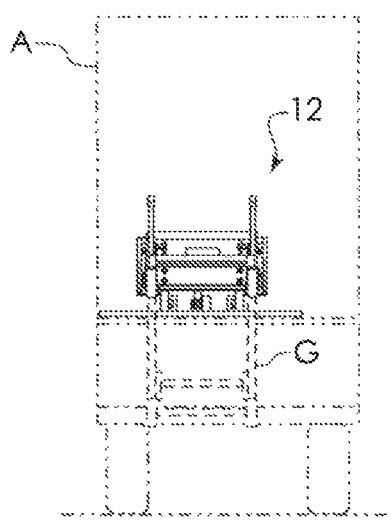

FIGS. 6A-6C show the lifted gurney ramp-less assembly (12) fully deployed from the ambulance with the gurney G lifted but still fully deployed. FIG. 6A shows the gurney ramp-less assembly (12) in the fully deployed position with the carriage assembly (14) lifted having the gurney G in the up position. The accordion-style hand pinch guard (48) is in a fully compressed position and is barely visible in FIG. 6A. FIG. 6B shows the gurney ramp-less assembly (12) in the fully deployed position with the carriage assembly (14) lifted and the gurney G installed and lifted. FIG. 6C shows a rear view of the gurney ramp-less assembly (12) with the gurney G fully installed with the wheels off of the ground but in extended position.

Figure 7A:
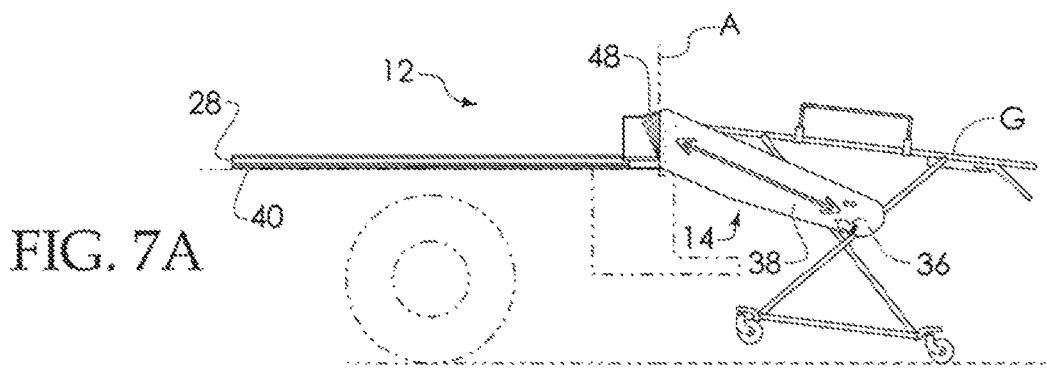
FIG. 7A-7E show the gurney lift and gurney from initial out and down in position to receive the gurney through intermittently positions till the gurney lift and gurney are retracted fully into the ambulance.
Figure 7B:
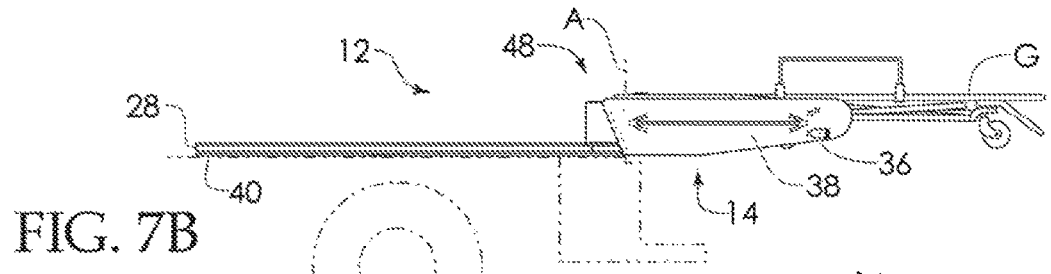
Figure 7C:
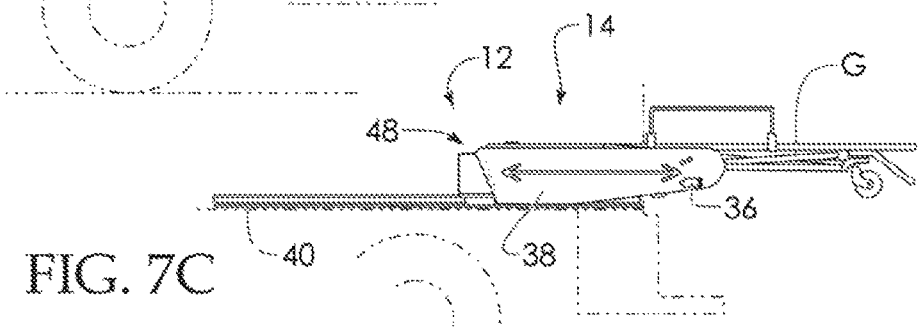
Figure 7D:
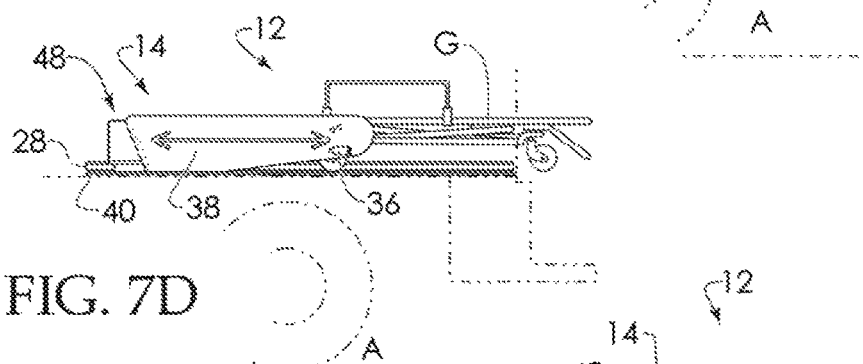
Figure 7E:
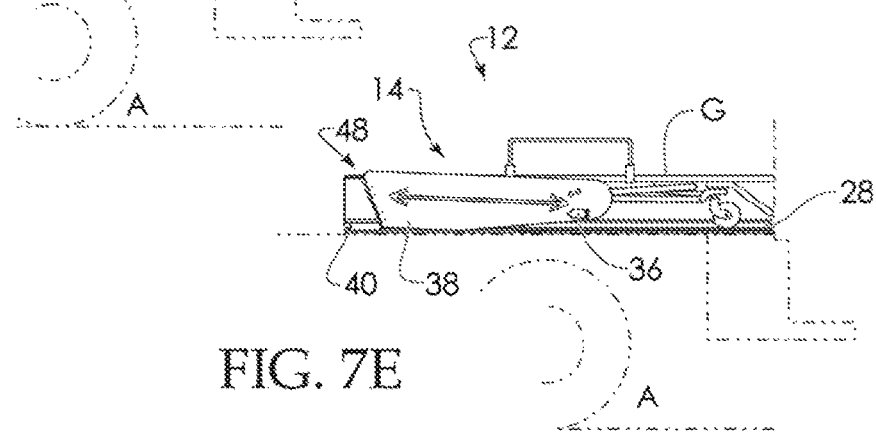

FIG. 7A-7E show the gurney lift (12) and gurney G from initial out and down in position to receive the gurney G through intermittently positions till the gurney lift (12) and gurney G are retracted fully into the ambulance A. FIG. 7A shows the gurney ramp-less assembly (12) fully deployed and in down position with a gurney G pushed into locked position to be lifted. FIG. 7B shows the gurney ramp-less assembly (12) fully deployed most horizontal position with the gurney G locked in and the wheel assembly raised ready to be stowed into the ambulance A. FIG. 7C shows the gurney ramp-less assembly (12) with the gurney G locked in partially retracted into the ambulance A. FIG. 7D shows the gurney ramp-less assembly (12) being retracted further into the ambulance A approaching the lockdown zone. FIG. 7E shows the gurney ramp-less assembly (12) fully stowed with gurney G locked into the ramp-less assembly (12) and in lock down position ready for ambulance A to transport.

Figure 8A:
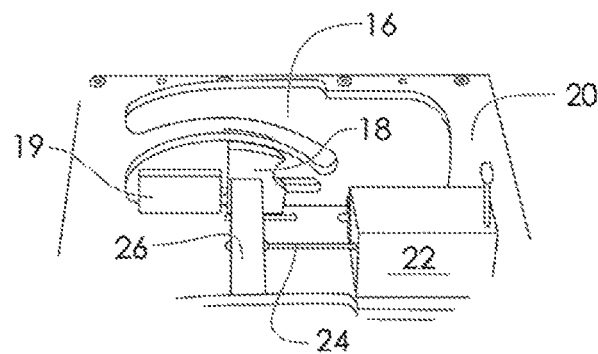
FIGS. 8A-8C show the apparatus that holds the gurney antler bar with the gurney antler bar being inserted and in place.
Figure 8B:
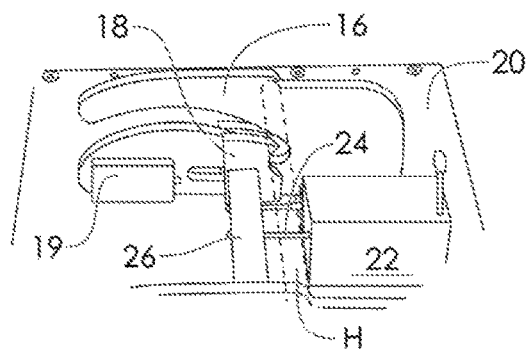
Figure 8C:
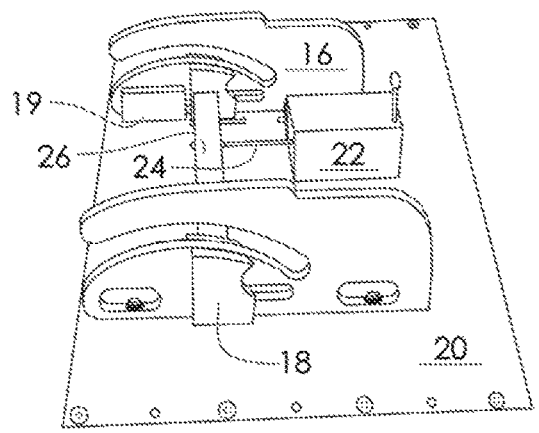

FIGS. 8A-8C show the apparatus that holds the gurney antler bar H with the gurney antler bar (26) being inserted and in place in FIG. 8B. In detail FIG. 8A shows the antler locks (16), with the latch (18) in an unlocked position as shown. A hydraulic jack (22) is also affixed to the carriage assembly (14) plate (20) and has an actuation arm (24) affixed to a bar (26) that moves the latches (18) from an open position to a closed position. The antler locks (16) and antler latches (18) are shown in FIG. 8C affixed to a carriage assembly (14) plate (20). A limit switch 19 is shown which stops the hydraulic jack (22) from extending the actuation arm (24) and the attached bar (26) past the proper position when open.

Figure 9A:
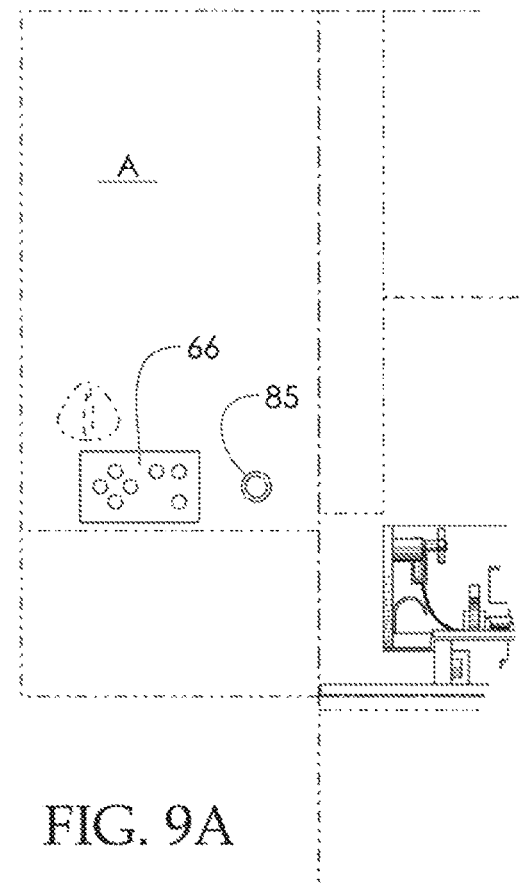
FIGS. 9A and 9B show an embodiment of a controller interface (66) for actuating the gurney lift.
Figure 9B:
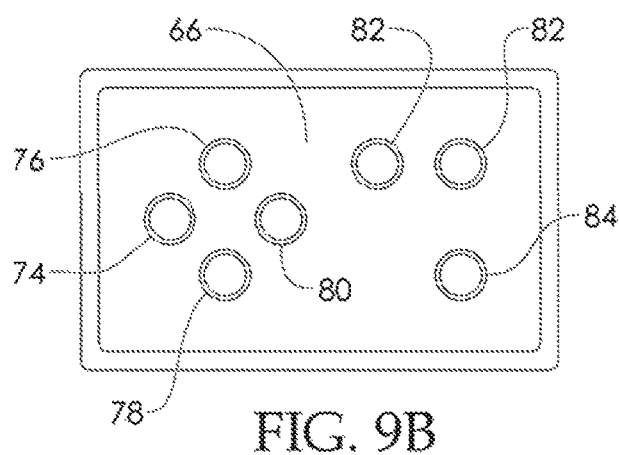

FIGS. 9A and 9B show an embodiment of an optional controller interface (66) for actuating the gurney lift (12). The controller interface (66) may be attached to the back door of an Ambulance A for convenience. Alternatively, a handheld remote or the like may be used. The controller interface (66) has buttons for lifting (76) and lowering (78) the carriage arm (38), and for stowing (80) or extending (74) the ramp-less assembly (12). An emergency kill button 85, or two buttons (82) actuated simultaneously, should also be available. A washdown over-ride button (84) may also be provided. These features are optional as the assembly may be operated manually to stow or extend the ramp-less assembly (12) by simply pulling the carriage assembly (14) along the tracks (28) manually. The control panel (66) may also be integrated via wireless or similar technology with all controls and functions physically attached to or into a commonly used gurney or cot.

Figure 10A:
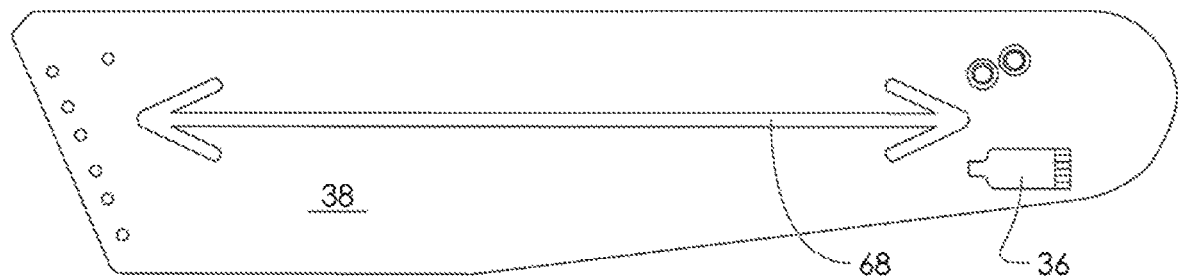
FIGS. 10A and 10B show a side view of the carriage arm (38) with light indicator and showing manual gurney wheel frame locking bracket (36).
Figure 10B:
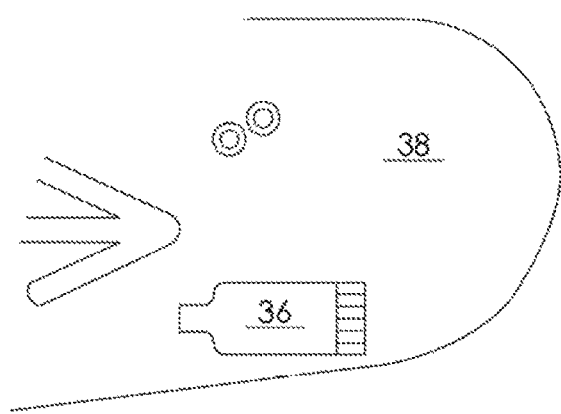
Figure 12A:
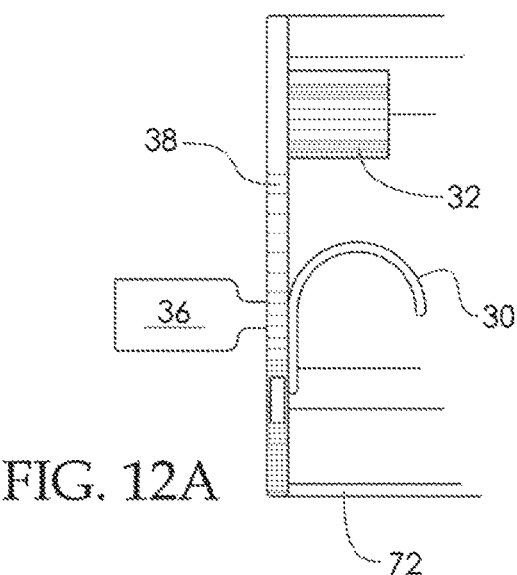
FIGS. 12A and 12B show rear view of the mechanisms shown in FIG. 11 that engages and retains the undercarriage of a gurney in open and closed positions respectively.
Figure 11:
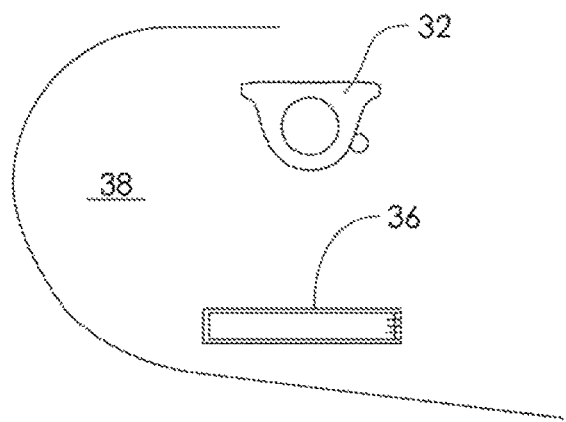
FIG. 11 show a plan view of the pickup parts for the gurney frame used to support the undercarriage of the gurney.
Figure 12B:
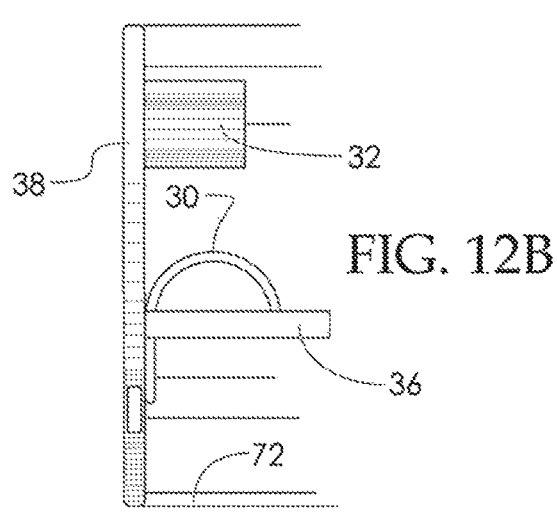

FIGS. 10A and 10B show a side view of the carriage arm (38) with light indicator (68), and showing manual gurney wheel frame locking bracket (36). FIG. 11 show a plan view of the pickup parts for the gurney frame used to support the undercarriage of the gurney and keep it from becoming dislodged. Namely, the position of the rotating pickups (32) and the pivoting wheel locking brackets (36). The pickups (32) may have internal integrated quick release function for use on different styles gurneys and cots. FIGS. 12A and 12B show another rear view of the mechanisms shown in FIG. 11 that engages and retains the undercarriage of a gurney in open and closed positions respectively. FIG. 12A shows an end view of idler wheel lock (30) down bracket (36) and wheel frame locking bracket (36) open with bed frame pickup, and carriage angle mates (72). FIG. 12B shows an end view of idler wheel lock (30) down bracket and wheel frame locking bracket (36) closed with bed frame pickup.

Figure 13A:
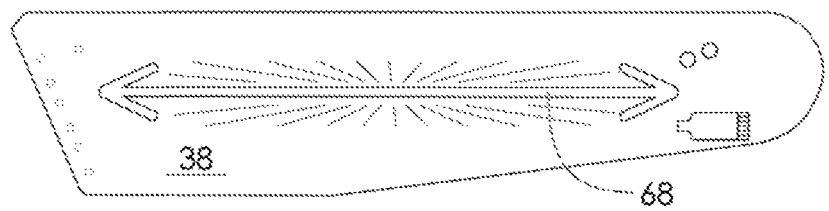
FIGS. 13A-13F shows an arrangement of light indicators on the arm (38).
Figure 13B:
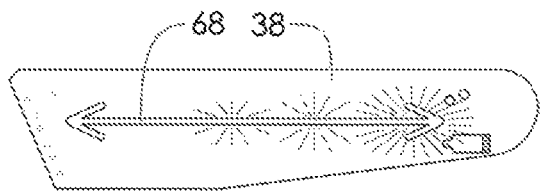
Figure 13C:
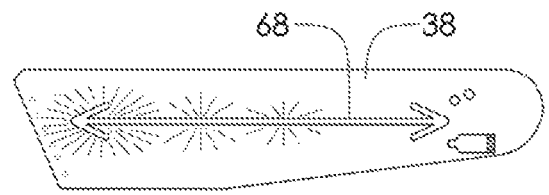
Figure 13D:
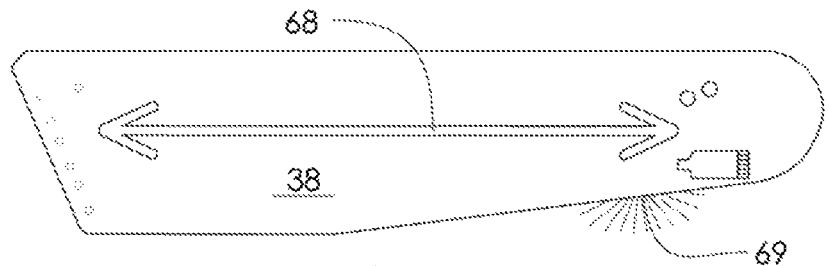
Figure 13E:
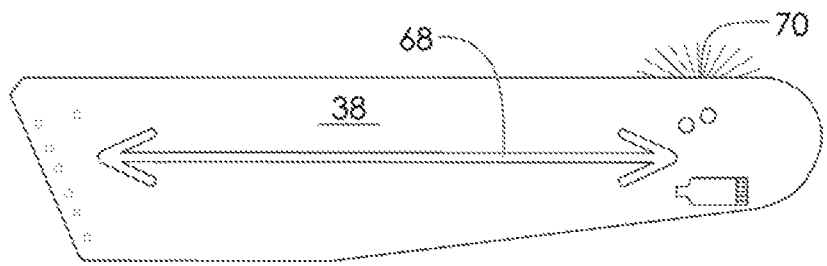
Figure 13F:

FIGS. 13A-13F shows an arrangement of light indicators (68) on the arm (38). The lighting features are optional, and the ray lines indicate lit indicator lights (68). FIG. 13A shows the carriage arm (38) indicator lights (68) flashing red in any stopped position. FIG. 13B shows flashing chasing green lights indicating assembly is being deployed, while FIG. 13C shows the shows the flashing chasing green lights indicating that the assembly is being retracted while being stowed. FIG. 13D shows the white ground illumination lights (69) constantly on while deployed. FIG. 13E shows the gurney locked/unlocked indicator lights red (70) indicating not locked, green indicating locked gurney ramp-less assembly with not function without gurney properly locked into assembly. FIG. 13F shows the white work station lights (71) remain on while gurney is not locked into position.

Figure 14:
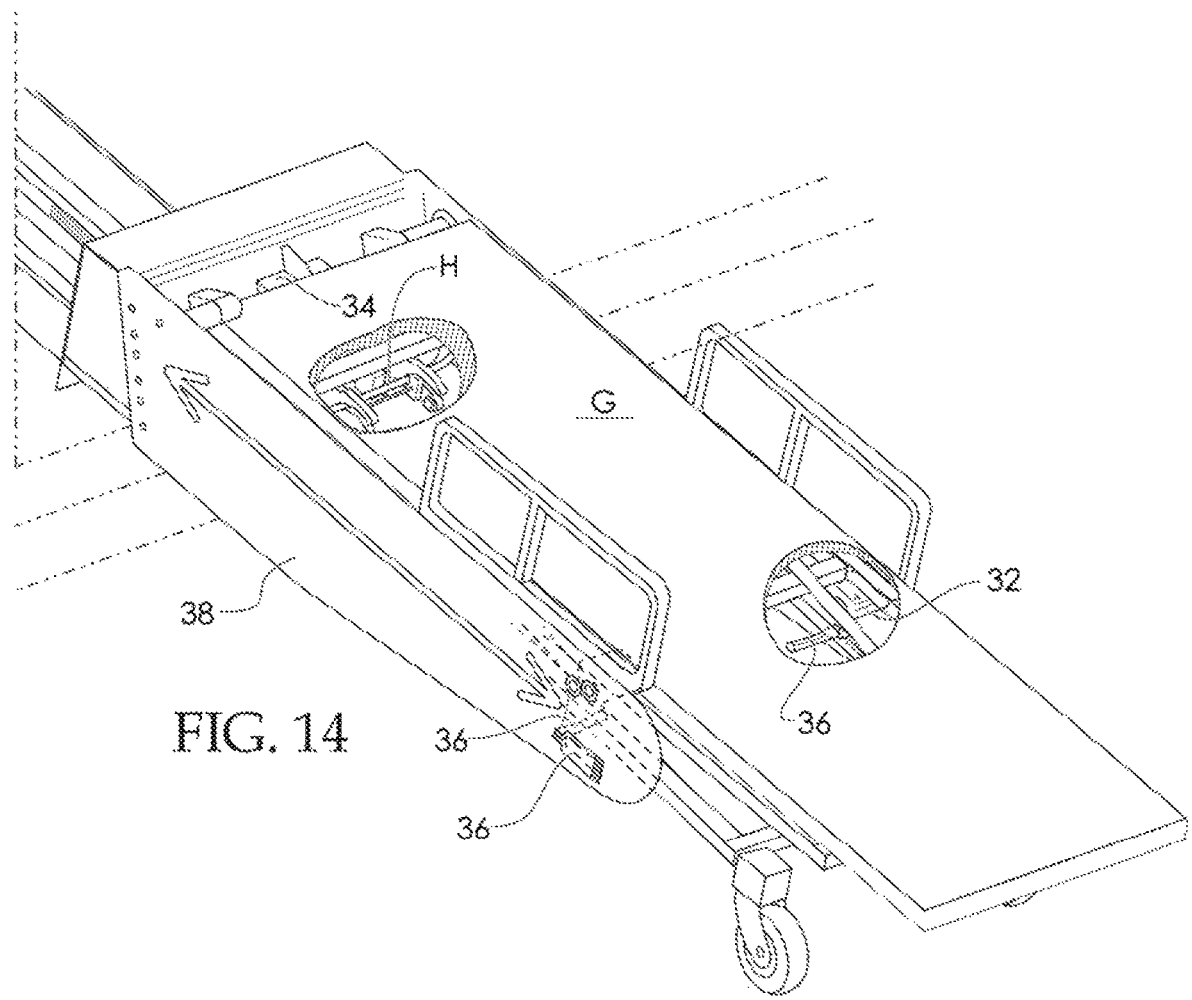
FIG. 14 shows an elevated perspective view of a gurney lift with gurney engaged thereon showing the mechanism of the gurney lift as it engages with a gurney.
Figure 15:
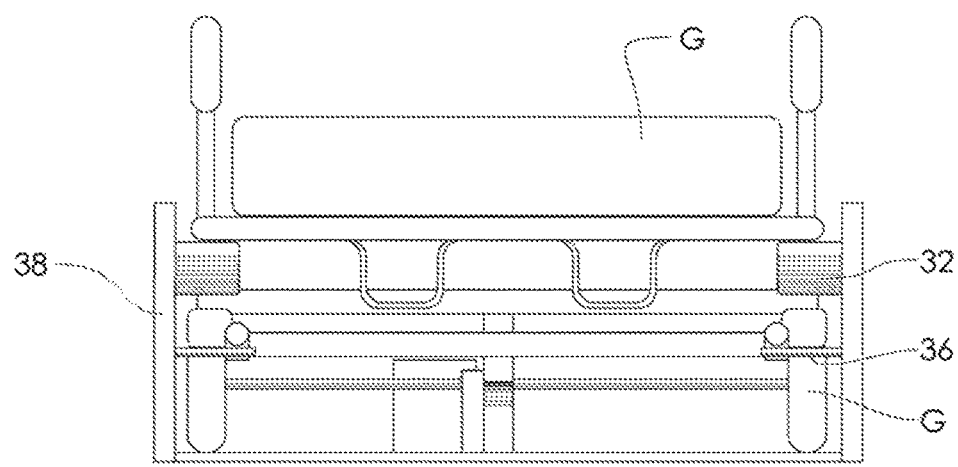
FIG. 15 shows a rear view of the gurney as stowed from the rear.

FIG. 14 shows an elevated perspective view of a gurney lift (12) with gurney G engaged thereon showing the mechanism of the gurney lift as it engages with a gurney. FIG. 14 shows the ramp-less assembly fully deployed at most horizontal position with cutaway of the gurney to show antler and wheel frame locking components, as can be seen in the two cutaways. FIG. 15 shows a rear view of FIG. 14 with the ramp-less assembly (12) with the gurney G from the rear. FIG. 15 shows a rear view of the gurney G as stowed from the rear. FIGS. 16A and 16B show the position of an alternative locking bracket (36)' and the locking ball 37 disposed at the end of the locking bracket (36)', as shown.

The gurney lift actuator 88 is preferably a jack that is used to lift the arms (38), and may be a hydraulics for power. The hydraulic supply unit 90 and jacks (22) and 88 are shown most clearly in FIGS. 17A and 17B, which show the position of the hydraulics as viewed with the casing removed above the mechanical parts. FIG. 17A is a plan view of the entire deployable gurney ramp-less assembly (12) from above showing the mechanical parts, including the hydraulic supply unit 90. The locking hydraulic jack (22) which locks the antler lock (16) and latch (18) is supplied by the locking hydraulic supply unit 90. The lifting hydraulic jacks 88 are supplied by the lifting hydraulic supply units 90 which lower and lift each arm (38). Valve blocks 94 are shown in FIG. 17B, which also shows the optional drive motor 92 which turns the drive gear (44) to deploy and stow the carriage assembly (14).

Figure 18A:
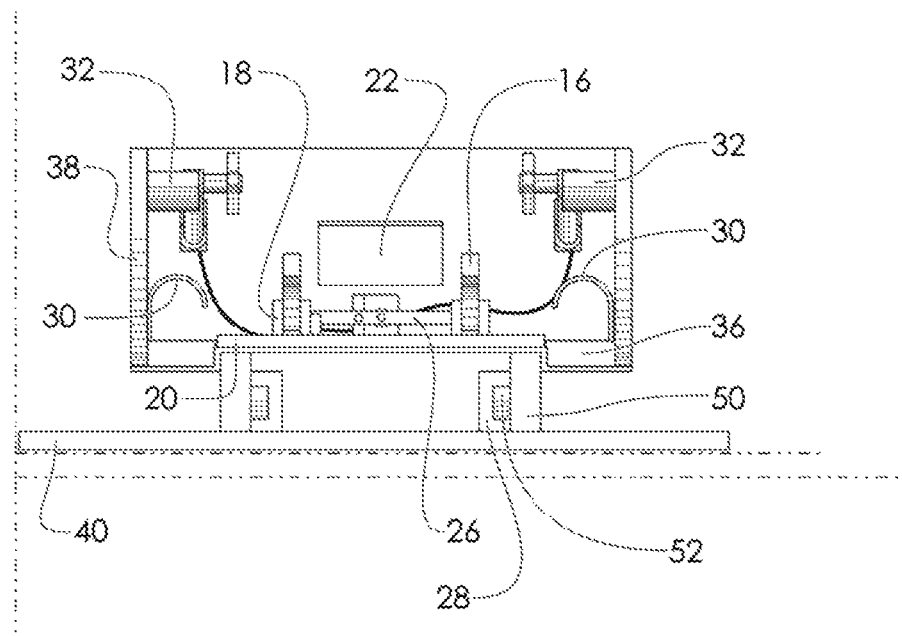
Figure 18B:
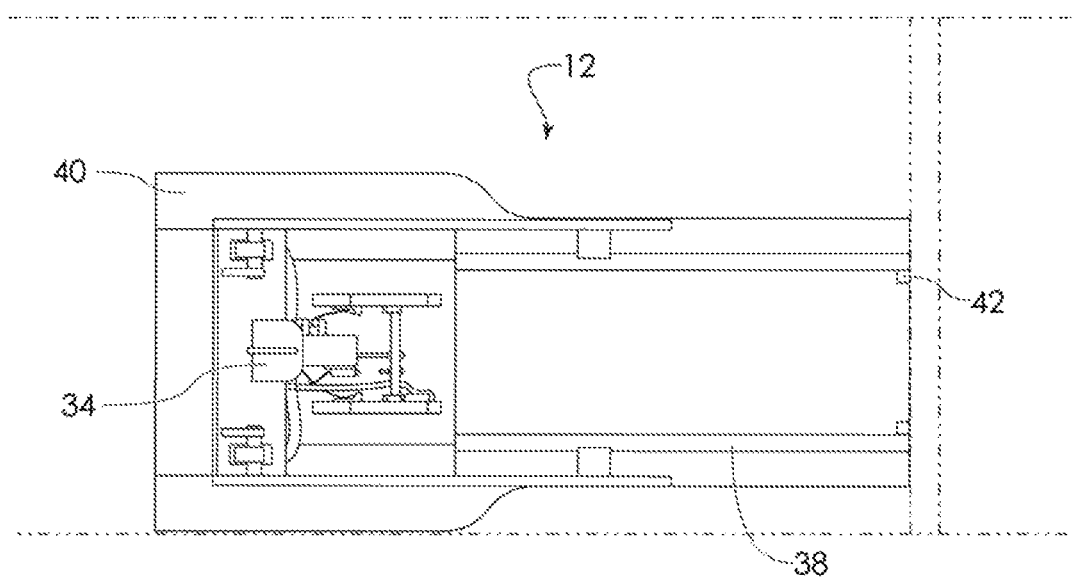
Figure 18C:
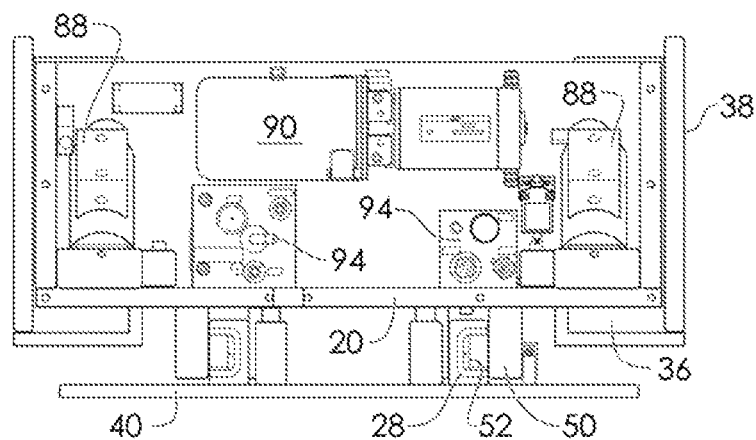

FIGS. 18A-18C show an alternative embodiment of the deployable gurney ramp (12) and carriage assembly (14) which is deployed by manually pulling the carriage assembly (14) out and manually pushing the carriage assembly (14) back in. In this embodiment the gear (44) and motor 92 are not present, and therefore, there is no mechanical stow and deploy. Instead in this embodiment, a gurney G is manually stowed and deployed by pushing and pulling the carriage (14) apparatus physically. The hydraulic supply 90, and the hydraulic jacks (22) and 88 remain the same.

Figure 19:
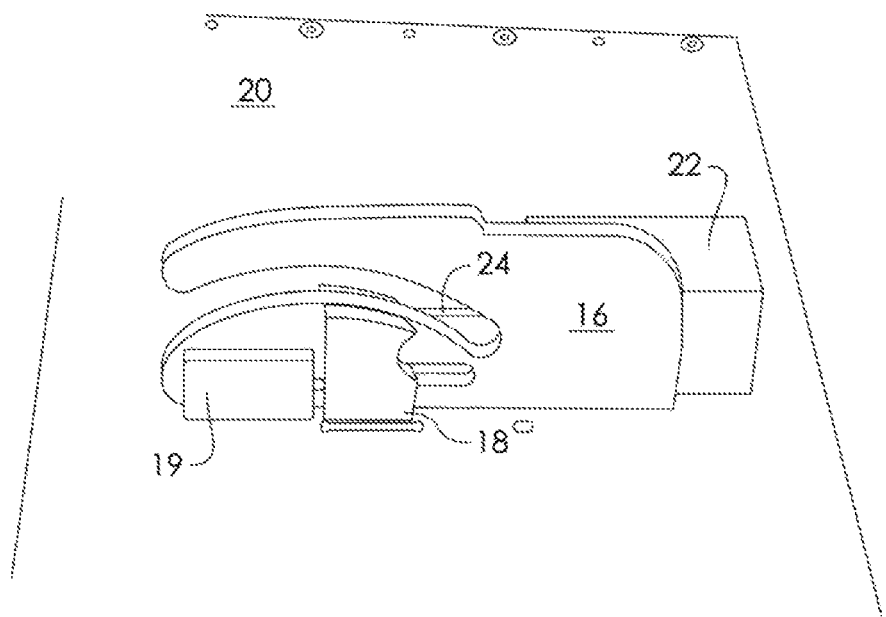
FIG. 19 shows yet another economical alternative embodiment of the present invention in which a single antler is used to hold the handle of a gurney engaged in position thereon.

FIG. 19 shows yet another alternative embodiment of the carriage assembly (14) in which a single antler lock (16) and latch (18) are used to hold the handle H of a gurney G engaged in position thereon. The antler lock (16) and antler latch (18) are shown affixed to a carriage assembly (14) plate (20). A hydraulic jack (22) is also affixed to the carriage assembly (14) plate (20) and has an actuation arm (24) affixed to moves the latch (18) from an open position to a closed position. The actuation arm (24) may be affixed directly to the latch (18) or to an actuation arm (24). Additionally, the antler lock (16) may be centrally disposed or may be disposed to one side or the other.

It is to be understood that the present invention is not limited to the embodiments described above, but encompasses any and all embodiments within the scope of the following claims.

What is claimed is:

1. A deployable gurney lift assembly (12) for lifting a gurney G with sides and an undercarriage including wheels, an antler bar H, and an apparatus for raising and lowering the gurney G, comprising:
   at least one deployment rail (28) extending from front to rear ends;
   a carriage assembly (14);

the carriage assembly (14) having a carriage assembly (14) plate (20) with a top side and an underside, two pivot arms (38) disposed opposite one another on opposing edges of the carriage assembly (14) plate (20) to engage the sides of the gurney G, and at least one antler holder (16) affixed to the carriage assembly (14) plate (20) to accommodate an antler bar H of the gurney G;

at least one lift actuator 88 for lifting and lowering the arms (38);

wherein, the lift actuator 88 is electric, pneumatic, or hydraulic; and at least one retraction guide (50) on the underside of the carriage assembly (14) plate (20) to engage the at least one deployment rail (28) for slidably moving the carriage assembly (14) along the length of the at least one deployment rail (28).

2. The deployable gurney lift assembly (12) of claim 1, wherein:
the front and rear ends of at least one deployment rail (28) terminating at stops (42) to secure the carriage assembly (14) from advancing off the rail (28).

3. The deployable gurney lift assembly (12) of claim 1, wherein:
the antler holder (16) comprises at least one antler lock (16) and at least one antler latch (18) to receive and secure a gurney antler handle therein.

4. The deployable gurney lift assembly (12) of claim 1, wherein:
the at least one deployment rail (28) is opposing first and second deployment rails (28) extending parallel from front ends to rear ends; and
the at least one retraction guide is corresponding first and second carriage assembly (14) guides slidably engaged along the length of the deployment rails (28);
the guides extending from the underside of the carriage assembly (14) plate (20);
each guide having a wheel bearing extending therefrom to engage a rail (28) to support movement of the carriage assembly (14) plate (20) along the rails (28).

5. The deployable gurney lift assembly (12) of claim 1, wherein:
the lift actuators are taken from the group consisting of a telescoping ram, hydraulic jack (22), or vertical lifting column.

6. The deployable gurney lift assembly (12) of claim 5, wherein:
the lift actuators comprise at least two lowering, lifting apparatuses fixed on the carriage assembly (14) to lift each arm (38).

7. The deployable gurney lift assembly (12) of claim 6, wherein:
the lift actuator comprises at least one hydraulic jack (22) which is supplied by a lifting hydraulic supply unit to lower and lift each arm (38).

8. The deployable gurney lift assembly (12) of claim 1, wherein:
each arm (38) has a wheel lock (30), rotating pickup (32), and a wheel locking bracket (36) to secure the sides of the gurney;
the wheel locking bracket (36) being disposed under the rotating pickups (32), and having an open position and a closed position to secure the gurney between the arms (38).

9. The deployable gurney lift assembly (12) of claim 8, wherein:
the wheel locking bracket (36) comprises a pivoting wheel locking bracket (36), or a push button wheel locking bracket (36) which has a locking ball retaining the locking bracket (36) on the arm (38) when in the open position.

10. The deployable gurney lift assembly (12) of claim 1, further comprising:
a wheel frame lock (34) extending over the gurney when the handle is engaged in the antler lock (16).

11. The deployable gurney lift assembly (12) of claim 3, further comprising:
a hydraulic jack (22) affixed to the carriage assembly (14) plate (20);
the hydraulic jack (22) having an actuation arm (24) affixed to a bar (26) which is fixed to each of the at least one anther latches (18) to move each of the at least one antler latch (18) from an open position to a closed position.

12. The deployable gurney lift assembly (12) of claim 1, further comprising:
a drive motor with a shaft (55) extending therefrom disposed in the carriage assembly (14);
a gear rack (46) with teeth (56) disposed parallel to the at least one deployment rail (28); and
a drive gear (44) disposed at the end of the shaft (55); wherein
the drive gear (44) engages the teeth (56) on the gear rack (46) such that when the drive motor rotates the drive gear (44) the carriage assembly (14) is advanced along the teeth (56) of the gear rack (46) to deploy and stow the carriage assembly (14).

13. The deployable gurney lift assembly (12) of claim 12, further comprising:
a gear rack plate (54) disposed on the gear rack (46), and having the teeth (56) disposed on the gear rack plate (54).

14. The deployable gurney lift assembly (12) of claim 1, further comprising:
at least one light disposed on at least one of the arms (38); wherein
the at least one light includes
at least one deployment indicator light (68) to indicate deployment status of the carriage assembly (14), in which the deployment statuses include stowing, deploying, and stopped statuses; or
at least one ground illumination light (69) to illuminate downward from the arms (38); or
at least one gurney lock (16) or unlocked indicator light (70); or
at least one work station light (71) that illuminates the carriage assembly (14) when unlocked; or
combinations thereof.

15. The deployable gurney lift assembly (12) of claim 1, further comprising:
a controller interface (66) for actuating the gurney lift assembly (12), wherein
the controller interface (66) is either wired or wireless and either an attached controller or an unattached handheld remote controller.

16. The deployable gurney lift assembly (12) of claim 1, wherein:
power is provided by hydraulic, or pneumatic, or electrical alternating current, or electrical direct current, or combinations thereof.

17. The deployable gurney lift assembly (12) of claim 1, wherein:
power is provided directly to the controller, or the carriage assembly (14), or combinations thereof, by a vehicle battery supply; or
power is provided by a rechargeable battery power supply to recharge the controller, or the carriage assembly (14) when fully stowed, or combinations thereof.

18. A carriage assembly (14) for a deployable gurney lift assembly (12) to lift a gurney G with sides and an undercarriage including wheels, an antler bar H, and an apparatus for raising and lowering the gurney G using a deployment assembly having at least one deployment rail (28) extending from front to rear ends, the carriage assembly (14) comprising:

a carriage assembly (14) plate (20) with a top side and an underside, two pivot arms (38) disposed opposite one another on opposing edges of the carriage assembly (14) plate (20) to engage the sides of the gurney G, and at least one antler holder (16) affixed to the carriage assembly (14) plate (20) to accommodate an antler bar H of the gurney G;

at least one of the at least one antler holders (16) having at least one antler lock (16) with an antler latch (18) to receive and secure a gurney antler handle therein;

at least one lift actuator 88 for lifting and lowering the arms (38);

wherein, the lift actuator 88 is electric, pneumatic, or hydraulic; and at least one retraction guide (50) on the underside of the carriage assembly (14) plate (20) to engage the deployment assembly for slidably moving the carriage assembly (14) along the length thereof to deploy or stow the carriage assembly (14).

19. The carriage assembly (14) of claim 18, wherein:

the at least one retraction guide has corresponding first and second carriage assembly (14) guides slidably engaged along the length of the deployment assembly, which deployment assembly has a pair of opposing first and second deployment rails (28);

the guides extending from the underside of the carriage assembly (14) plate (20);

each guide having a wheel bearing extending therefrom to engage a rail (28) to support movement of the carriage assembly (14) plate (20) along the rails (28).

20. The carriage assembly (14) of claim 18, wherein:

the lift actuators are taken from the group consisting of a telescoping ram, hydraulic jack (22), or vertical lifting column; or the lift actuators comprise at least two lowering, lifting apparatuses fixed on the carriage assembly (14) to lift each arm (38); or the lift actuator comprises at least one hydraulic jack (22) which is supplied by a lifting hydraulic supply unit to lower and lift each arm (38); or combinations thereof.

21. The carriage assembly (14) of claim 18, wherein:

each arm (38) has a wheel lock (30), rotating pickup (32), and a wheel locking bracket (36) to secure the sides of the gurney, the wheel locking bracket (36) being disposed under the rotating pickups (32), and having an open position and a closed position to secure the gurney between the arms (38); or the wheel locking bracket (36) comprises a pivoting wheel locking bracket (36), or a push button wheel locking bracket (36) which has a locking ball retaining the locking bracket (36) on the arm (38) when in the open position; or a wheel frame lock (34) extending over the gurney when the handle is engaged in the antler lock (16); or combinations thereof.

22. The carriage assembly (14) of claim 18, further comprising:

a hydraulic jack (22) affixed to the carriage assembly (14) plate (20);

the hydraulic jack (22) having an actuation arm (24) affixed to a bar (26) which is fixed to each of the at least one anther latches (18) to move each of the at least one antler latch (18) from an open position to a closed position.

23. The carriage assembly (14) of claim 18, further comprising:

a drive motor with a shaft (55) extending therefrom disposed in the carriage assembly (14); and a drive gear (44) disposed at the end of the shaft (55).

24. The carriage assembly (14) of claim 18, further comprising:

at least one light disposed on at least one of the arms (38); wherein the at least one light includes at least one deployment indicator light (68) to indicate deployment status of the carriage assembly (14), in which the deployment statuses include stowing, deploying, and stopped statuses; or at least one ground illumination light (69) to illuminate downward from the arms (38); or at least one gurney lock (16) or unlocked indicator light (70); or at least one work station light (71) that illuminates the carriage assembly (14) when unlocked; or combinations thereof.

25. The carriage assembly (14) of claim 18, further comprising:

a controller interface (66) for actuating the gurney lift assembly (12), wherein the controller interface (66) is either wired or wireless and either an attached controller or an unattached handheld remote controller.

26. The carriage assembly (14) of claim 18, wherein:

power is provided directly to the controller, or the carriage assembly (14), or combinations thereof, by a vehicle battery supply; or power is provided by a rechargeable battery power supply to recharge the controller, or the carriage assembly (14) when fully stowed, or combinations thereof.

27. The deployable gurney lift assembly (12) of claim 18, wherein:

power is provided by hydraulic, or pneumatic, or electrical alternating current, or electrical direct current, or combinations thereof.

* * * * *